July 2, 1940.  J. E. McINTOSH ET AL  2,206,549
WELDING APPARATUS
Filed April 3, 1939   2 Sheets-Sheet 1

INVENTOR.
JOHN EDWARD McINTOSH
HAROLD UREN
BY
ATTORNEYS

Patented July 2, 1940

2,206,549

UNITED STATES PATENT OFFICE 2,206,549

WELDING APPARATUS

John Edward McIntosh and Harold Uren, Chigwell, England, assignors to Briggs Manufacturing Company, Detroit, Mich., a corporation of Michigan Application April 3, 1939, Serial No. 265,810
In Great Britain September 5, 1938

6 Claims. (Cl. 219—4)

This invention relates generally to electrical welding apparatus and refers more particularly to improvements in welders of the type capable of seam welding the work pieces together.

It is one of the principal objects of this invention to provide a relatively simple inexpensive welder composed of a comparatively few light parts compactly arranged in an assembly rendering it possible to readily manipulate the welder to effect the desired welding operation.

Another advantageous feature of this invention resides in the provision of a welder of the character set forth in the preceding paragraph rendering it possible to secure the parts together with a continuous seam weld and, in addition, offering the possibility of readily welding sheets having curved or irregular surfaces.

A further object of this invention consists in the provision of a welder having cooperating electrodes in the form of rolls positioned opposite each other to grip the work to be welded therebetween and having provision for driving one or both of the rolls to facilitate manipulation of the welder.

The foregoing, as well as other objects, will be made more apparent as this description proceeds, especially when considered in connection with the accompanying drawings wherein.

Figures 1, 2:
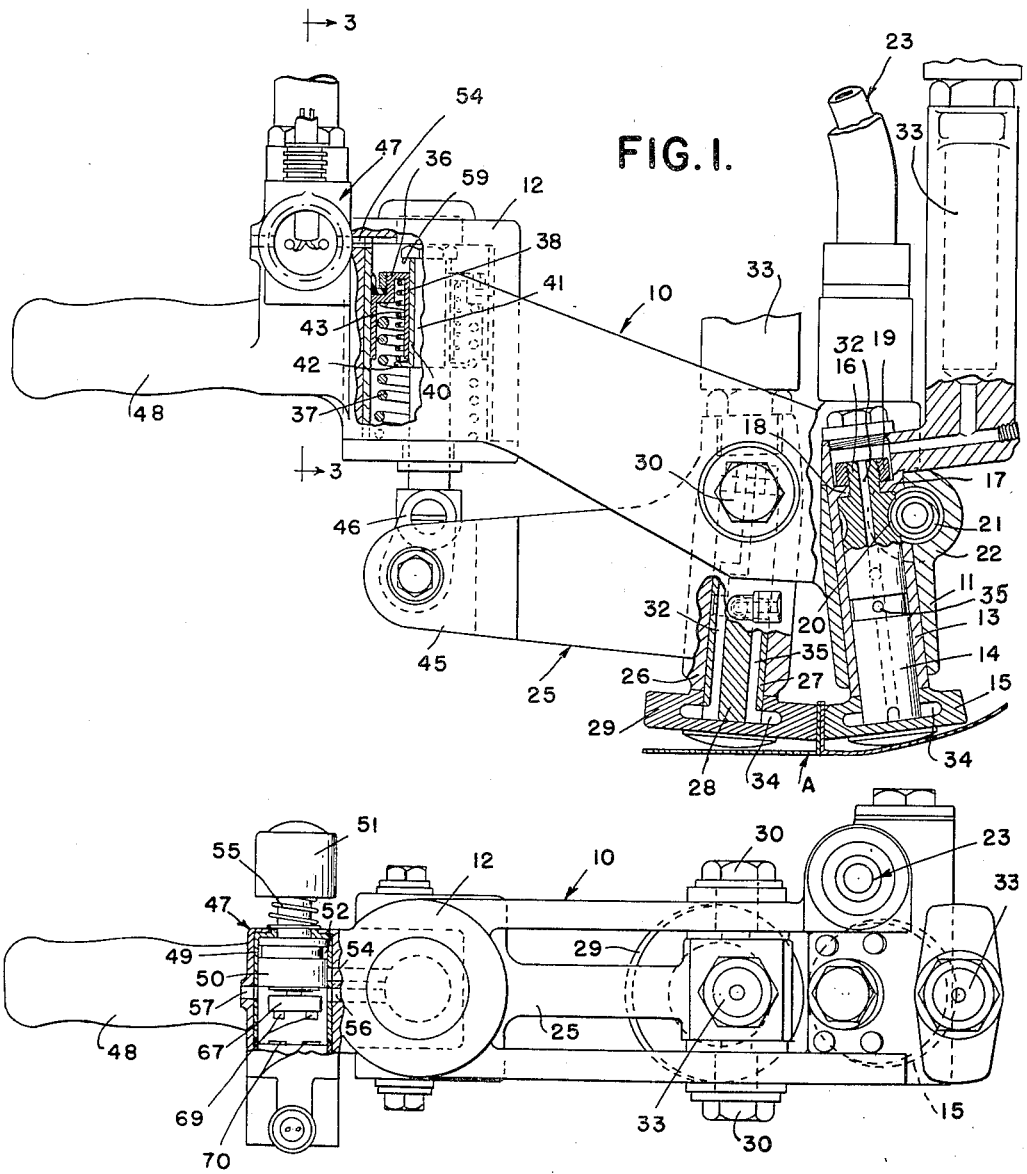
Figure 1 is an elevational view, partly in section, of welding apparatus constructed in accordance with this invention.
Figure 2 is a plan view, partly in section, of the apparatus shown in Figure 1.

Referring now more in detail to the drawings, it will be noted that our improved welding apparatus is provided with a bifurcated frame 10 having a hub 11 at one end of the furcations thereof and having a cylinder 12 at the opposite end of the same. Sleeved within the hub 11 is a bushing 13 forming a journal for a spindle 14 having a roller 15 secured to one end thereof and constituting one electrode of the welding apparatus. The opposite end of the spindle is provided with a reduced threaded portion 16 forming a shoulder 17 adapted to abut the adjacent side of a web 18 formed integral with the bushing 13 and projecting radially inwardly of the bushing. The web 18 is centrally apertured to receive the threaded reduced portion 16 and a nut 19 is threaded on the reduced portion 16 for engagement with the opposite side of the web 18 to cooperate with the shoulder 17 in preventing axial displacement of the spindle relative to the sleeve. It is to be noted, however, that the spindle 14 is not fixedly clamped to the sleeve 13 since the electrode or roller 15 is driven by rotating the spindle 14 relative to the sleeve 13.

In the present instance, a portion of the spindle is fashioned to form a worm wheel 20 having teeth adapted to mesh with a suitable worm 21 journalled in an enlargement 22 of the hub 11 for rotation about an axis extending at substantially right angles to the axis of the spindle. The worm 21 is operatively connected to a drive shaft 23 in any suitable manner (not shown herein) and the wall of the bushing 13 opposite the worm is cut away sufficiently to permit the desired intermeshing relationship between the teeth on the worm and the teeth on the worm wheel. The drive shaft 23 is preferably of a flexible nature and is operatively connected to an electric motor 24, either directly, or through suitable reduction gearing (not shown herein). In any event, the motor 24 drives the flexible shaft 23 which, in turn, effects the desired rotation of the electrode or roller 15.

Carried by the frame 10 is an arm 25 having one end extending between the furcations and pivotally connected thereto for swinging movement about an axis extending transversely to the axis of the spindle 14. In detail, the end aforesaid of the arm is provided with a hub 26 arranged in juxtaposed relation to the hub 11 on the frame with the axis thereof located in a plane including the axis of the hub 11. The hub 26 is lined with a sleeve 27 forming a journal for a suitable spindle 28 and the lower end of the spindle 28 has a roller 29 secured thereto. The roller 29 forms the cooperating electrode of the apparatus and cooperates with the roller 15 in the position of the parts shown in Figure 1 to grip the work A to be welded therebetween. The roller 29 is of greater diameter than the roller 15 and may, or may not be driven.

The upper end of the spindle 28 is secured in the hub 26 in the same manner as the spindle 14 is secured in the hub 11 and the spindle, together with the hub 26, is pivotally connected to the furcations 10 by the studs 30. The arrangement is such as to permit the arm 25 to be swung in a plane, including the axis of the roller 15, in a manner to effect movement of the electrode or roller 29 toward and away from the electrode 15.

Both the electrodes are shown in Figure 1 as being artificially cooled and, for accomplishing this result, both the spindles are axially drilled to form passages 32 communicating with fluid supply conduits 33. The rollers are recessed, as at 34, to provide jackets for receiving the cooling medium discharging from the lower ends of the passages 32 and the spindles are formed with additional passages 35 through which the fluid medium is exhausted.

The arm 25 is swung about its pivotal connection to the frame 10 by means of a fluid operated piston 36 reciprocably mounted in the cylinder 12 and normally urged upwardly, or in a direction to swing the roller or electrode 29 away from the electrode 15 by means of a spring 37. In the present instance, the piston 36 is provided with a centrally disposed hub portion 38 slidably engaging a sleeve 40 which, in turn, is fixed on a stud 41 and having a radially outwardly extending flange 42 on the lower end forming an abutment for the corresponding end of the hub 38. A coil spring 43 surrounds the hub 38 with the upper end engaging the piston head and having the lower end engaging the flange 42. In other words, the spring 43 acts as a cushion and prevents the lower end of the hub 38 from hammering against the flange 42 when pressure is introduced into the upper end of the cylinder 12.

The stud 41 extends below the lower end of the cylinder 12 and is connected to the bifurcated end 45 of the arm 25 by means of a link 46. The arrangement is such that when fluid pressure is admitted to the cylinder above the piston 36, the latter is moved downwardly against the action of the springs to abut the lower end of the hub 38 with the flange 42. Inasmuch as the flange 42 is fixed relative to the stud 41, it follows that the latter is also moved downwardly with the piston and, due to the connection between the lower end of the stud and arm 25, the latter is swung about its pivotal connection with the frame in a direction to move the electrode or roller 29 toward the cooperating electrode 15.

Figure 3:
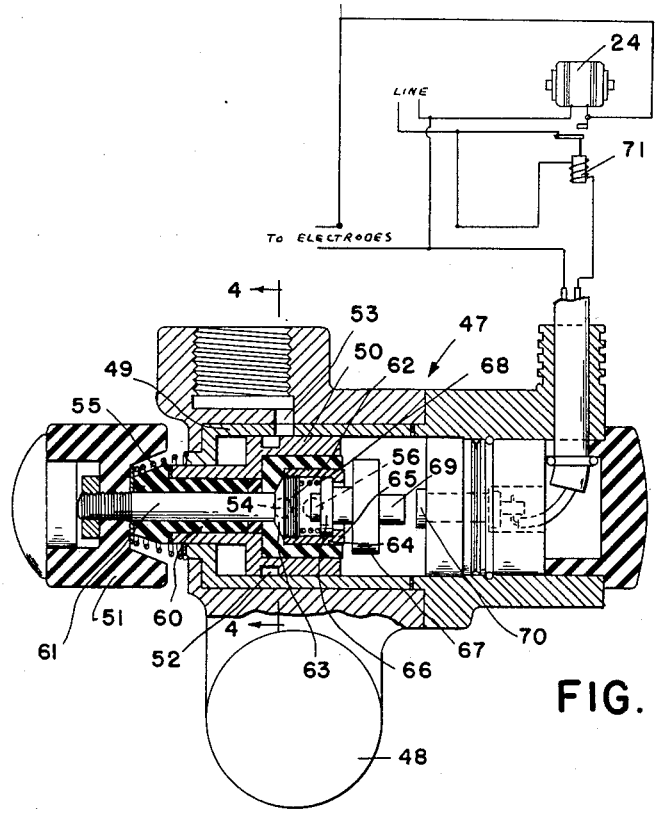
Figure 3 is a sectional view taken substantially on the plane indicated by the line 3—3 of Figure 1.
Figure 4:
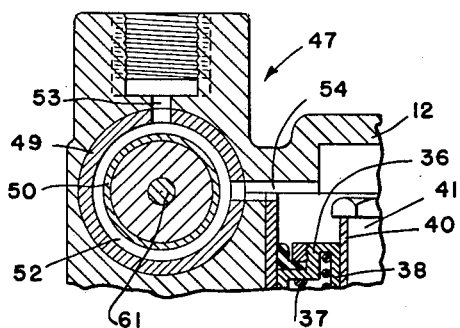
Figure 4 is a cross sectional view taken substantially on the plane indicated by the line 4—4 of Figure 3.

Fluid pressure is admitted to the upper end of the cylinder 12 by means of a combined switch and valve unit 47 supported on the frame 10 adjacent the cylinder 12 and handle 48. The combined switch and valve 47 comprises a cylinder 49, sleeved in a bore formed in the frame 10, and a piston 50 reciprocably mounted in the cylinder. The piston 50 is movable axially of the cylinder 49 by means of a manually operable control element 51 and is provided with an annular groove 52 in the outer surface, adapted to communicate with a fluid pressure supply port 53 in the position of the piston shown in Figure 3. Also, in the above mentioned position of the piston, the annular groove 52 communicates with the upper end of the cylinder 12 through the medium of a passage 54 in the manner clearly shown in Figure 4. The piston is moved to the position shown in Figure 3 against the action of a spring 55 so that releasing of the control element 51 by the operator returns the piston to its outermost position relative to the cylinder whereupon the exhaust passage 56 is uncovered by the piston permitting fluid to escape from the cylinder 12 through the exhaust port 57. A drop in pressure in the cylinder 12 above the piston permits the spring 37 to move the piston 36 upwardly relative to the stud until the head of the piston abuts the shoulder 59 on the upper end of the stud, whereupon continued upward movement of the piston under the action of the spring 37 effects a swinging movement of the electrode 29 away from the electrode 15. The lost motion provided in moving the electrode 29 out of engagement with the work is for the purpose of insuring opening of the circuit to the electrodes before the work is disengaged by the electrodes.

Referring again to Figure 3 of the drawings, it will be noted that the piston 50 is provided with an insert 60 of a suitable insulating material, and this insert is axially bored to receive a stud 61. The outer end of the stud is threaded to provide for attaching the control element 51 thereto and the inner end of the stud is fashioned with an enlarged threaded head portion 62 forming a frusto-conical shoulder 63 engaging a corresponding shoulder formed on the insert to secure the stud to the piston 50. A cage or retainer 64 is threaded on the enlarged head 63 of the stud and is provided with a radially inwardly extending flange 65 forming an abutment for an enlargement 66 on a switch contact carrying plunger 67. The enlargement 66 on the plunger 67 is normally urged into engagement with the flange 65 by means of a coil spring 68 housed in the retainer with the opposite ends respectively engaging the stud and plunger. The plunger 67 is provided with spaced contact members 69 adapted to engage cooperating stationary contact elements 70 to complete a welding circuit through the electrodes and to also close the circuit to the motor 24 through the solenoid 71. The general arrangement is such that continued movement of the valve piston 50 from the position thereof shown in Figure 3 closes the circuit to the motor 24 to drive the electrode 15 and also closes the welding circuit to the electrodes.

*Operation*

Assuming that the parts of the apparatus are in a position wherein the electrode 29 is spaced from the electrode 15, it will be noted that initial movement of the control element 51 by the operator against the action of the spring 55 establishes communication between the source of fluid under pressure and the upper end of the cylinder 12. This communication is established before the switch contacts 69 are moved into engagement with the cooperating switch contacts 70 so that the piston 36 is moved downwardly to effect movement of the electrode 29 into engagement with the work prior to closing the circuit to the electrodes. Continued movement of the control element 51 causes the switch contacts 69 to engage the cooperating switch contacts 70 to complete the circuit to the motor 24 and to also complete the welding circuit to the electrodes. Closing of the circuit to the motor 24, of course, effects a positive drive of the electrode 15 and assists in moving the welder along the work to be welded together.

When the weld has been completed, the control 51 is released permitting the spring 55 to open the welding circuit and the circuit to the motor 24. During this return movement of the control 51, the piston valve 50 closes the fluid pressure intake port 53 and opens the exhaust passage 56 after the circuit to the electrodes has been discontinued. Exhausting the pressure from the cylinder 12 permits the spring 37 to move the piston 36 into engagement with the shoulder 59 on the stud 24 and raise this stud the extent necessary to swing the electrode 29 out of engagement with the work.

What we claim as our invention is:

1. In welding apparatus, a pair of electrodes arranged in an electrical circuit and supported for relative movement toward and away from each other, one of the electrodes being in the form of a roll, fluid pressure operated means for relatively moving the electrodes toward each other into clamping engagement with the work to be welded, an electric motor arranged in an electric circuit and operatively connected to said roll for driving the latter, and valve means for controlling the fluid pressure operated means and having provision for closing the motor circuit in timed relation to admitting fluid pressure to said fluid pressure operated means.

2. In welding apparatus, a pair of electrodes arranged in an electrical circuit and comprising opposed rolls supported for relative movement toward and away from each other, fluid pressure operated means for relatively moving the rolls toward each other into clamping engagement with the work to be welded, an electric motor arranged in an electric circuit and operatively connected to one of the rolls for driving the latter, and valve means for controlling the fluid pressure operated means and having provision for closing both the motor circuit and electrode circuit in timed relation to relative movement of the electrodes into engagement with the work.

3. In welding apparatus, a pair of electrodes arranged in an electrical circuit and comprising opposed rolls supported for relative movement toward and away from each other, fluid pressure operated means for relatively moving the rolls toward each other into clamping engagement with the work to be welded, a switch in the electrode circuit, valve means for controlling the fluid pressure operated means and including a plunger movable in one direction to successively admit fluid pressure to said fluid pressure operated means and close said switch, and an electric motor operatively connected to one of the rolls for driving the same and rendered operative by said plunger upon movement of the latter in the direction aforesaid.

4. In welding apparatus, a frame having a hub, a spindle rotatably supported in the hub and having a roll secured thereto forming an electrode, an arm pivotally mounted on the frame and carrying a revoluble roll forming a second electrode movable by the arm toward and away from the first electrode, fluid pressure operated means connected to the arm for swinging the latter in a direction to move the second roll toward the first roll, and valve means also carried by the frame and controlling said fluid pressure operated means.

5. In welding apparatus, a frame having a hub, a spindle rotatably supported in the hub and having a roll secured thereto forming an electrode, an arm pivotally mounted on the frame and carrying a revoluble roll forming a second electrode movable by the arm toward and away from the first electrode, fluid pressure operated means connected to the arm for swinging the latter in a direction to move the second roll toward the first roll, an electric circuit for the electrodes, a switch in said circuit, valve means controlling the fluid pressure operated means and having provision for successively admitting fluid pressure to the fluid pressure operated means and closing said switch, and means rendered operative by said valve means to drive one of said rolls.

6. In welding apparatus, a pair of electrodes arranged in an electric circuit and supported for relative movement toward and away from each other, one of the electrodes being in the form of a roll, means for relatively moving the electrodes toward each other into engagement with opposite sides of a work piece, means for closing the circuit to the electrodes in timed relation to relative movement of the electrodes into engagement with the work, power driven means operatively connected to said roll for rotating the same, and means operated by said circuit closing means in timed relation to closing of the circuit to the electrodes to render the power driven means operative.

JOHN EDWARD McINTOSH.
HAROLD UREN.